United States Patent Office.

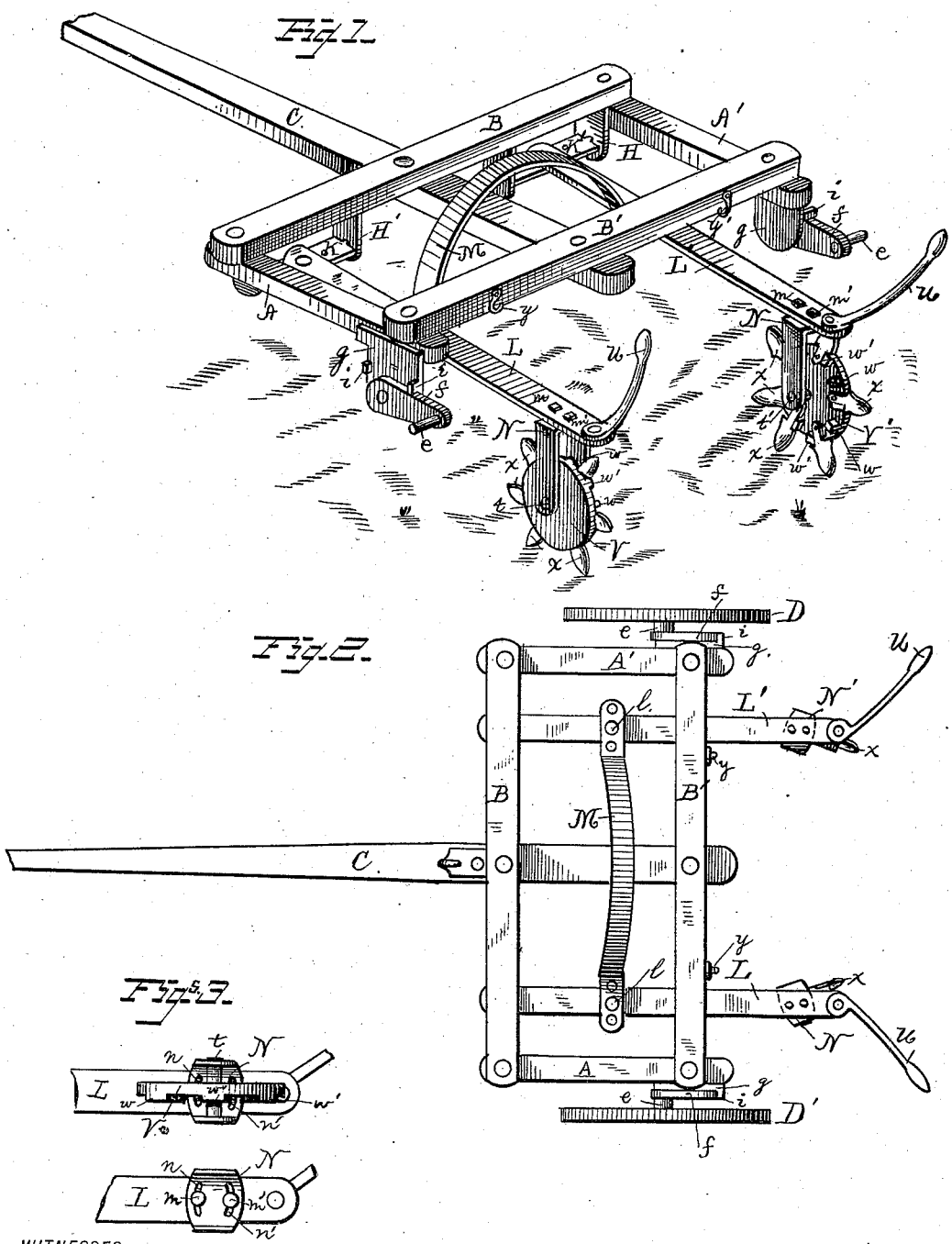

JAMES MALLON, OF BATON ROUGE, LOUISIANA.

ROTARY CULTIVATOR.

SPECIFICATION forming part of Letters Patent No. 305,613, dated September 23, 1884.

Application filed February 7, 1884. (No model.)

*To all whom it may concern:*

Be it known that I, JAMES MALLON, a citizen of the United States, and a resident of the city of Baton Rouge, parish of East Baton Rouge, and State of Louisiana, have invented a certain new and useful Improvement in Cultivators; and I do hereby declare the following to be a full, clear, and correct description of the same, reference being had to the annexed drawings, making a part of this specification.

This invention relates to the combination, with the frame of a cultivator, constructed as hereinafter described, of a pair of pivoted beams carrying adjustable bearings in which are journaled the shafts of wheels or disks that are provided with side projections and pivoted teeth for operating, as hereinafter described.

In the drawings, Figure 1 is a perspective view of my improved cultivator with traction-wheels removed therefrom. Fig. 2 is a top view of the machine complete, and Figs. 3 are detailed views thereof.

By reference to the drawings it will be seen that the cultivator-frame and pivoted beams are substantially the same as employed in my Patent No. 206,185, the frame of the machine being composed of two longitudinal strips of timber, A A', connected at suitable distances apart by cross-ties B B', to the centers of which the draft-pole C is secured. This frame is mounted on wheels D D', which operate on pins $e$ of arms $f$, that are pivoted to side plates, $g$. These plates are secured near the rear ends of the strips A A', and are each provided with outwardly-projecting lugs $i$ $i$, forming bearing for the arms $f$ when thrown in either a forward or rearward position. The front cross-tie, B, is provided with two pairs of hangers, as shown at H H', in the lower ends of which are journaled the ends of rocking pieces K K', in which are a series of perforations for adjustably connecting the forward ends of the beams L L', the latter connected by an arched brace, M, which is made to straddle the rear end of the draft-pole, as shown. The ends of this brace are bent outwardly and provided with perforations for the reception of bolts $l$, whereby means is afforded for changing the angle of the beams as the nature of the work may require.

N N' are journal-bearings, which are secured to the under sides of the beams L L' and near the rear ends thereof, by means of bolts $m$ $m'$, the holes for which are elongated and curved, as at $n$ $n'$, to enable the operator to adjust the same at different angles.

In the lower ends of the bearings N N' are journaled the shafts $t$ $t'$, on which are keyed or otherwise secured the disks or wheels V V', having side projections formed in pairs around the inner edges of the peripheries thereof, as shown at $w$ $w'$, between which the cutters or diggers $x$ operate. These cutters or diggers are formed of flat or hammered metal with angular points or heads which are curved or bent so as to freely dig and turn the earth. The shanks of these diggers are of reduced width, and their inner ends are pivoted to the inner sides of the disks or wheels in such manner as to allow their outer portions to vibrate between the lugs. The rear of each beam is provided with a handle, U, so that the operator may follow at either side of the row, and hooks $y$ $y'$ are secured to the rear of the cross-tie B', for holding the said beams and cutters clear of the ground when not required for use.

From the above it will be seen that the distance between the cultivators may be changed at pleasure to suit soil or work to be done.

This machine is particularly adapted for operation in heavy or sticky ground, as the arrangement of pivoted diggers insures the free discharge of the earth raised thereby.

Having described my invention, what I claim as new, and desire to secure by Letters Patent, is—

In combination with the cultivator-frame provided with pivoted beams, as herein described, the adjustable journal-bearings N N', shaft $t$ $t'$, the disks or wheels having side projections, $w$ $w'$, and the pivoted diggers $x$, arranged to operate between said projections, substantially as described, and for the purpose set forth.

In testimony whereof I affix my signature in presence of two witnesses.

JAMES MALLON.

Witnesses:
VICTOR VINCENT,
W. J. KNOX.